US007004624B2

(12) United States Patent
Liu

(10) Patent No.: US 7,004,624 B2
(45) Date of Patent: Feb. 28, 2006

(54) TEMPERATURE MEASUREMENT APPARATUSES AND METHOD UTILIZING THE ALEXANDRITE EFFECT

(76) Inventor: Yan Liu, 1460 Rock Haven St., Monterey Park, CA (US) 91754

( * ) Notice: Subject to any disclaimer, the term of this patent is extended or adjusted under 35 U.S.C. 154(b) by 59 days.

(21) Appl. No.: 10/713,491

(22) Filed: Nov. 14, 2003

(65) Prior Publication Data

US 2005/0105585 A1    May 19, 2005

(51) Int. Cl.
*G01K 11/00*    (2006.01)
*G01J 5/00*    (2006.01)
(52) U.S. Cl. .................... 374/162; 374/130; 374/121
(58) Field of Classification Search ............... 374/161, 374/163, 121
See application file for complete search history.

(56) References Cited

U.S. PATENT DOCUMENTS

| 3,912,521 | A | 10/1975 | Cline |
| 4,142,417 | A | 3/1979 | Cashdollar |
| 4,240,834 | A | 12/1980 | Machida |
| 4,880,314 | A | 11/1989 | Kienitz |
| 5,326,172 | A | 7/1994 | Ng |
| 5,772,323 | A | 6/1998 | Felice |
| 6,357,910 | B1 | 3/2002 | Chen et al. |

FOREIGN PATENT DOCUMENTS

| JP | 56033518 A | * | 4/1981 |
| JP | 57000532 A | * | 1/1982 |

OTHER PUBLICATIONS

Shand et a., "Temperature Dependence of the Excited-State Absorption of Alexandrite", IEEE Journal of Quantum Electronics, vol. QE-19, No. 3, pp. 480-484, Mar. 1983.*

Augousti et al., "A Laser-Pumped Temperature Sensor Using the Fluorescent Decay Time of Alexandrite", Journal of Lightwave Technology, vol. LT-5, No. 6, pp. 759-762, Jun. 1987.*
Alcala et al., "Real Time Frequency Domain Fiberoptic Temperature Sensor", IEEE Transactions on Biomedical Engineering, vol. 42, No. 5, pp. 471-476, May 1995.*
Bukin et al., "Growth of Alexandrite Crystals and Investigation of Their Properties", Journal of Crystal Growth, vol. 52, pp. 537-541, 1981.*

(Continued)

*Primary Examiner*—Diego Gutierrez
*Assistant Examiner*—Mirellys Jagan
(74) *Attorney, Agent, or Firm*—Charles C.H. Wu; Wu & Cheung, LLP

(57) ABSTRACT

A method and apparatuses for measuring the temperature of a radiating body utilizing the alexandrite effect. The method includes the steps of generating a mathematical relationship between a hue value and temperature for an alexandrite effect filter, receiving radiation from the radiating body, measuring a spectral power distribution of the radiation, calculating the hue value based on the spectral power distribution, and determining the temperature using the mathematical relationship. To implement the method, the apparatuses include an optical probe, a spectral or calorimetric measurement device, and a computer. The apparatuses can measure the temperature of any radiating body with or without spectral lines in the spectral power distribution, and are particularly advantageous to measure high to ultrahigh temperature for radiating bodies with spectral lines, such as plasma, electric arc, and high temperature flames.

11 Claims, 6 Drawing Sheets

OTHER PUBLICATIONS

Farmer, "Plasma Temperature Measurement", Handbook of Temperature Measurement: Temperature and Humidity Measurement, vol. 1, pp. 119-131, 1998.*

Liu et al., "The 'Alexandrite Effect' in Gemstones", Color Research & Application, vol. 19, No. 3, pp. 186-191, Jun. 1994.*

Liu et al., "Relationship Between the Crystallographic Orientation and the 'Alexandrite Effect' in Synthetic Alexandrite", Mineralogical Magazine, vol. 59, pp. 111-114, Mar. 1995.*

Liu et al., "Abnormal Hue-angle Change of the Gemstone Tanzanite between CIE Illuminants D65 and A in CIELAB Color Space", Color Research & Application, vol. 20, No. 4, pp. 245-250, Aug. 1995.*

Michalski et al., Temperature Measurement, 2nd ed. Wiley & Sons, pp. 151-228, 2001.*

* cited by examiner

TEMPERATURE MEASUREMENT APPARATUSES AND METHOD UTILIZING THE ALEXANDRITE EFFECT

BACKGROUND OF THE INVENTION

1. Field of the Invention

The invention relates in general to temperature measurement of a radiating body. More particularly, this invention relates to apparatuses and a method that utilize the principle of the alexandrite effect to measure temperature of any radiating body, such as, but not limited to, blackbody, graybody, plasma, electric arc, and combustion. The invented apparatuses are particularly advantageous to measure high to ultrahigh temperature of radiating bodies with spectral line emissions, such as plasma and electric arc.

2. Description of the Related Art

Pyrometers are known and commercially available for non-contacting temperature measurement of radiating bodies. Pyrometers can be particularly helpful in different contexts. First, they can be used when the target is located in a remote location. Pyrometers can also be helpful when the temperature or environment near the target is too hostile or severe for temperature measurement by other, more conventional, means. Finally, pyrometers are useful when temperature measurement by contact may alter the target temperature.

Conventional pyrometry methods include the two-color method, the disappearing filament method, the total radiation method, the photoelectric method, the two-wavelength method and the multi-wavelength method. The two and multi-wavelength methods are usually used to measure temperature by measuring the radiation of a radiating body in the infrared range, as described in U.S. Pat. No. 4,142,417 to Cashdollar, U.S. Pat. No. 4,880,314 to Kienitz, and U.S. Pat. No. 5,326,171 to Ng. U.S. Pat. No. 5,772,323 to Felice extends the multi-wavelength measurement into the visible range. In U.S. Pat. No. 6,109,783, Chen discloses a pyrometer that measures the temperature in hazardous environments using specially designed probes.

Although conventional pyrometers can measure the temperature of blackbody and graybody matter, they cannot measure the temperature of a radiating body with spectral line emission. A spectral line is a bright line found in the spectrum of some radiant source, and occurs when atomic, molecular, or gas excitation exists. Examples of radiating bodies that emit spectral lines include plasmas and electric arcs. The spectral lines in the spectral power distributions of these radiating bodies make conventional methods such as the multi-wavelength method void.

Special methods have been implemented to determine the temperature of gas and plasma over 5000° C. The methods include the absolute intensity method, the line ratio method, the relative intensity method, and the Rayleigh scattering method. These methods are inadequate, however. The absolute intensity method is not accurate, with error in the range of 10% to 20%. The line radio method, relative intensity method and the Rayleigh scattering method are expensive to implement, are only reasonably accurate, and are not readily available to consumers.

Therefore, the need arises for an apparatus and method capable of measuring radiating bodies of blackbody and graybody matter with continuous spectral power distribution, as well as plasma and electric arcs with spectral line emissions. The apparatus must be accurate, relatively inexpensive, and readily available to consumers.

SUMMARY OF THE INVENTION

Accordingly, one object of the present invention is to provide a temperature measurement apparatus and method that can accurately determine the temperature of blackbody and graybody matter.

A second object of the invention is to provide an ultra high temperature measurement apparatus that can accurately determine the temperature of plasma and electric arc matter.

A third object of the invention is to provide a temperature measurement apparatus that is readily inexpensive to manufacture and commercially available to consumers.

To achieve these and other advantages and in accordance with the purpose of the invention, as embodied and broadly described herein, the invention provides a method and apparatuses for measuring the temperature of a radiating body utilizing the alexandrite effect. The method includes the steps of generating a mathematical relationship between hue value and temperature for an alexandrite effect filter, receiving radiation from the radiating body, measuring a spectral power distribution of the radiation, calculating the hue value based on the spectral power distribution, and determining the temperature using the mathematical relationship. To implement the method, the apparatuses include an optical probe, a spectrometric or colorimetric measurement device, and a computer. The apparatuses can measure the temperature of any radiating body with or without spectral lines in the spectral power distribution and are particularly advantageous to measure high to ultrahigh temperature for radiating bodies with spectral lines, such as plasma, electric arc, and high temperature flames.

DESCRIPTION OF THE PREFERRED EMBODIMENTS

Figure 1:
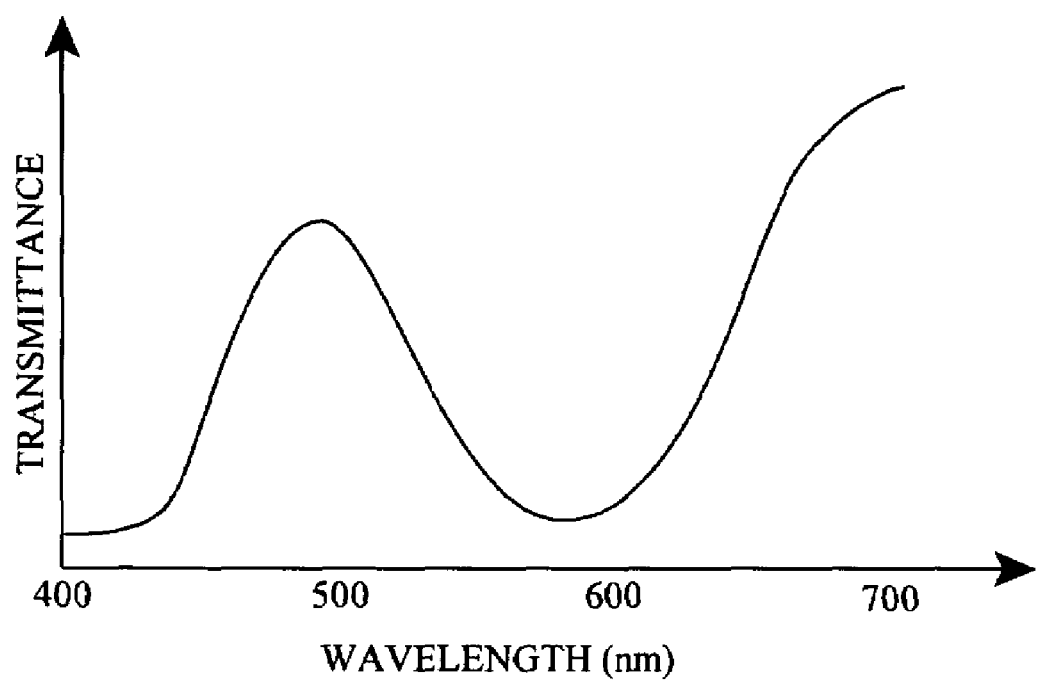
FIG. 1 is a graph depicting the typical spectral transmittance of alexandrite crystal in the visible wavelength range.

Before proceeding with a description of the apparatuses and method of the present invention, a summary of hue and the alexandrite effect, which may be helpful in understanding the disclosed embodiment, is provided.

Hue refers to the attribution of a color perception denoted by red, orange, yellow, green, blue, violet, purple, etc. Hue can be represented as, but is not limited to, a hue angle in the CIELAB color space, a hue angle in the CIELUV space, and a dominant wavelength in the CIE (x, y) system.

The alexandrite effect refers to the color change phenomenon in crystals between different light sources (Liu et al., Color Research & Application, Vol. 19, No. 3, pp. 186–191, 1994). For example, a gemstone alexandrite can appear bluish green under the daylight (6500 K) and purplish red under incandescent light (2856 K). The two colors in this example are opponent colors, with a hue-angle difference of about 180 degrees in the CIELAB color space. This is the largest possible color change for human color vision perception. Until now, the alexandrite effect did not have any scientific or technical application.

The alexandrite effect can be classified into four types. The type 1 color change corresponds to the temperature change of blackbody, as well as the color temperature change of different light sources. The type 2 alexandrite effect corresponds to the kinds of spectral differences between two light sources. The type 3 alexandrite effect corresponds to both color temperature changes and the kinds of spectral differences. The type 4 alexandrite effect corresponds to large color temperature differences between incandescent light and fluorescent light with a large color temperature difference (Liu et al., Color Research & Application, Vol.19, No. 3, pp. 186–191, 1994). Since the hue-angle of the type 1 alexandrite effect only relates to the temperature of a radiating body, regardless of its kind of spectral power distribution, the type 1 alexandrite effect can be used for measuring temperature of any radiating body.

Natural alexandrite crystal is difficult to obtain and very expensive. Therefore, alexandrite crystal has been synthesized for laser purposes and for gem material showing the alexandrite effect. U.S. Pat. No. 3,912,521 to Cline and U.S. Pat. No. 4,240,834 to Machida use the flux-melting method by combining chromium with iron or vanadium to produce alexandrite crystal. Cline also uses both the flux-melting method and a technique known as the Czochralski technique to growth alexandrite crystal. Machida produces a color change similar to that of natural alexandrite from the Ural Mountain. Bukin et al (J. Crystal Growth, Vol. 52. pp. 537–541, 1981) uses the Czochralski technique to create alexandrite crystal.

Liu et al. (Mineralogical Magazine, Vol. 59, pp. 111–114, 1994) studied the alexandrite crystal created by Bukin et al, and determined a relationship between crystallographic orientation and the alexandrite effect in the synthetic alexandrite. An alexandrite crystal has three crystallographic axes: a, b, and c. The alexandrite exhibits its greatest color change for light traveling parallel to the a crystallographic axis. Since many alexandrite effect crystals are anisotropic in crystal structure, the degree of color change varies at different crystallographic directions.

In the present invention, the relationship between the crystallographic orientation and the alexandrite effect in the synthetic alexandrite plays an important role in color change. The alexandrite exhibits its greatest color change for light traveling parallel to the a crystallographic axis. The surface of the alexandrite effect filter should be perpendicular to the a crystallographic axis, allowing the radiation from a radiating body to travel along the a crystallographic direction for obtaining maximum color change.

The present invention provides a method to measure temperature of a radiating body using the alexandrite effect, with three types of alexandrite effect pyrometers for temperature measurement in various applications to any types of radiating bodies. Theoretically, the range of temperature measurement by the alexandrite effect method can span the whole temperature range. Practically speaking, however, the temperature measurement range of the present invention is from 100° C. to 100,000° C. The wavelength range for the alexandrite effect pyrometer covers from short wavelength ultraviolet (100 nm) to infrared (5,000 nm). Thus, the wavelength range can be selected for a particular application.

The disclosed alexandrite effect method for temperature measurement is based on the color change phenomenon of the alexandrite effect crystal under different temperatures of blackbody. The spectral density w of radiant energy per unit wavelength interval at a temperature T of the blackbody is given by Planck's formula:

$$w(\lambda) = c_1 \lambda^{-5} \left( \exp\left(\frac{c_2}{\lambda T} - 1\right) \right)^{-1} \quad \text{(Equation 1)}$$

where $c_1 = 3.7415 \times 10^{-16}$ Wm$^2$, $c_2 = 1.4388 \times 10^{-2}$ mK, and $\lambda$ is the wavelength in meters.

In addition, T is the absolute temperature in Kelvin.

The spectral transmittances of alexandrite effect crystals are in three basic forms: two-band spectrum, multi-band spectrum, and step-band spectrum. FIG. 1 illustrates the typical two-band spectrum of an alexandrite crystal. When the radiation of a blackbody passes through the crystal, the crystal appears different colors at different temperatures of the radiating body.

The CIELAB color space is a uniform color space. The hue-angle of an alexandrite effect crystal can be calculated by Equations 2, 3 and 4. First, the tristimulus values X, Y, and Z are given by:

$X = \int \bar{x}(\lambda) s(\lambda) P(\lambda) d\lambda$ $Y = \int \bar{y}(\lambda) s(\lambda) P(\lambda) d\lambda$ $Z = \int \bar{z}(\lambda) s(\lambda) P(\lambda) d\lambda$ (Equation 2)

where $\bar{x}(\lambda)$, $\bar{y}(\lambda)$, and $\bar{z}(\lambda)$ are CIE color-matching functions, $s(\lambda)$ is the spectral power distribution of a radiating body, and $P(\lambda)$ is the spectral transmittance of the alexandrite effect filter. The spectral power distribution $s(\lambda)$ is the normalized spectral density $w(\lambda)$ as 100 at 560 nm, referred to as the relative spectral power distribution.

Next, the three coordinates of CIELAB color space can be calculated as follows:

$L^* = 116(Y/Y_n)^{1/3} - 16$ $a^* = 500[(X/X_n)^{1/3} - (Y/Y_n)^{1/3}]$ $b^* = 200[(Y/Y_n)^{1/3} - (Z/Z_n)^{1/3}]$ (Equation 3)

where $X_n$, $Y_n$, and $Z_n$ are the tristimulus values of the measured radiating body.

Finally, the equation for the hue-angle h in the CIELAB color space is given by:

$h_{ab} = \arc \tan(b^*/a^*)$ (Equation 4)

The color change of an alexandrite effect gemstone tanzanite is contrary to the calculated hue-angle change in the CIE color space using the CIE standard color matching functions. (Liu et al., Abnormal Hue-Angle Change Of The Gemstone Tanzanite Between CIE Illuminants D65 And A In CIELAB Color Space, Color Research & Application, Vol. 20, No. 4, pp. 245–250, 1995). The abnormal hue-angle change can be corrected by using the spectral sensitivity function of the three kinds of cone photoreceptors to directly calculate the color. The abnormal hue-angle change is caused by a coincidence of the large short wavelength band of the tanzanite with the short wavelength component of the $\bar{x}$ function. To avoid the abnormal hue-angle change, only the long wavelength component of the $\bar{x}$ function is used to calculate the hue-angle. The used $\bar{x}$ function in Equation 2 is zero from 380 nm to 510 nm, and the actual values range from 510 nm to 760 nm.

Figure 2:
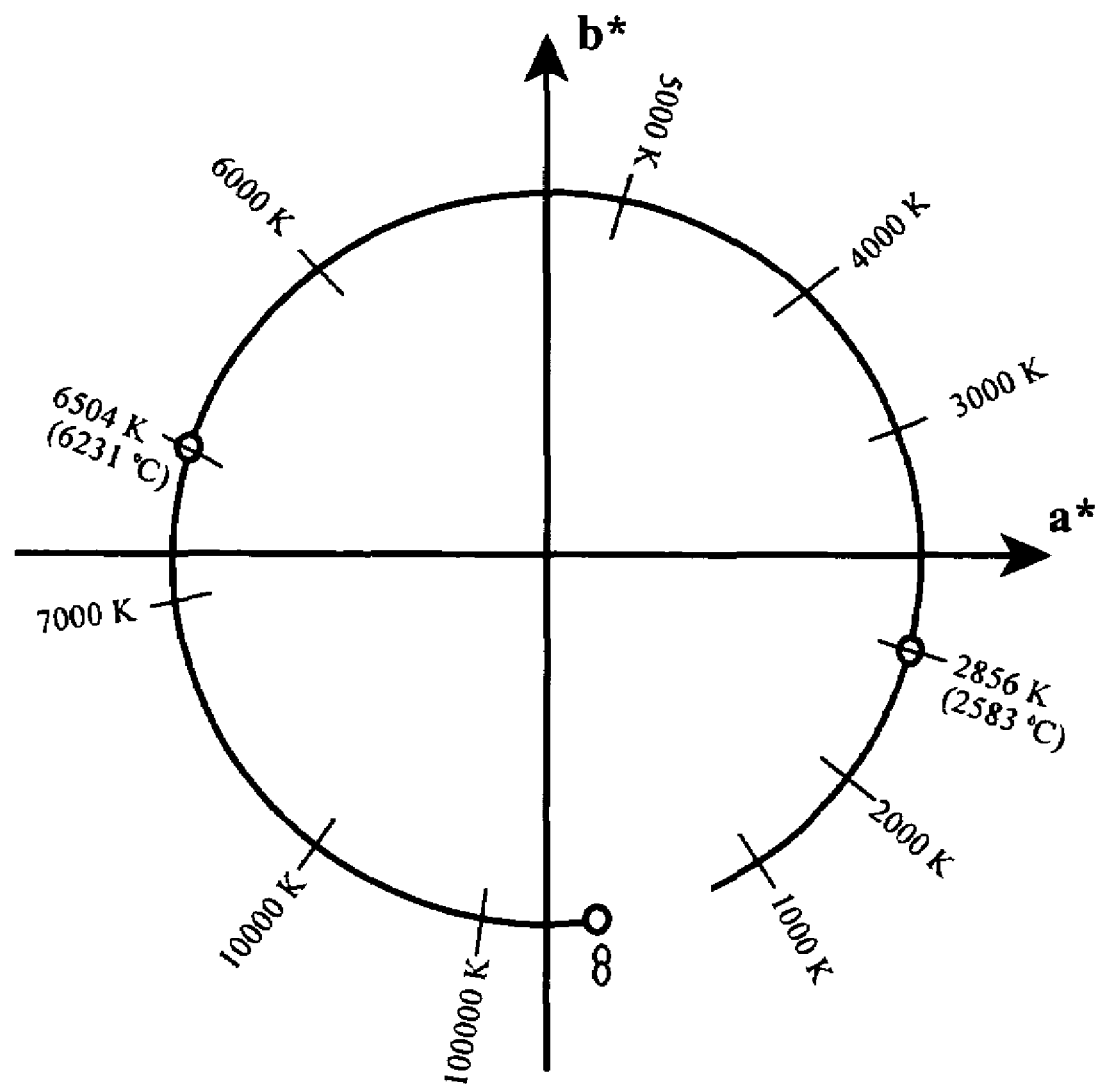
FIG. 2 is a diagram illustrating the relationship between the hue-angle of the alexandrite crystal along the a crystallographic axis and the temperature of blackbody in the CIELAB color space.

With reference to FIG. 2, a diagram illustrating the relationship between the hue-angle of the alexandrite crystal along the a crystallographic axis and the temperature of blackbody in the CIELAB color space is shown. The hue-angle of the synthetic alexandrite crystal is approximately 335 degrees at 2856 K, which is a reddish purple hue, and 162 degrees at 6500 K, which is a bluish green hue. The hue-angle difference between 2856 K and 6500 K of blackbody is approximately 173 degrees. The hue-angle differences along the b and c crystallographic axes are smaller, roughly 59 degrees and 66 degrees respectively (Liu et al. Relationship Between The Crystallographic Orientation And The Alexandrite Effect In Synthetic Alexandrite, Mineralogical Magazine, vol. 59, pp. 111–114, 1995). A slight change of the spectral transmittance of the alexandrite can cause a very large decrease of the hue-angle change. The spectral curve of the synthetic alexandrite crystal along the a crystallographic axis is optimal with the largest hue-angle change. If the two bands move away from their original wavelength range over 5 nm, or if the relative strengths of the two bands change, the alexandrite effect may not even exist.

The relationship between temperature and hue-angle can be determined by mathematics methods. Temperature is a function of hue-angle:

$$T=f(h) \quad \text{(Equation 5)}$$

where h is the hue-angle in the CIELAB color space. A polynomial function to the sixth power of hue-angle is usually adequate for most temperature measurement applications:

$$T=a_0+a_1h+a_2h^2+a_3h^3+a_4h^4+a_5h^5 a_6h^6 \quad \text{(Equation 6)}$$

In a small temperature range, a polynomial function to the third power of hue-angle is sufficient. Since the spectral curves of the alexandrite effect crystals vary, other types of functions may be necessary to determine the relationship between temperature and hue-angle, such as an exponential function, a logarithm function, a trigonometric function, or mixed functions. Fourier transfer, finite element analysis, and other mathematic methods may be helpful to determine the relationship.

The hue-angle of the type 1 alexandrite effect depends only on temperature of a radiating body, and little on its type of spectral power distribution. This property is the base for the temperature measurement of any radiating body using the alexandrite effect. An alexandrite effect pyrometer can accurately measure the temperature of a radiating body, regardless of its type of spectral power distribution.

The calculation of the hue-angle is an integration of the whole measured wavelength range. Therefore, the temperature measurement by the alexandrite effect is also an integration operation covering the entire wavelength range measured. The integration calculation of the alexandrite effect pyrometer has three advantages. First, all spectral lines existing in the measured wavelength ranges of the spectral power distribution of a radiating body are taken into calculation, therefore allowing the invented alexandrite effect spectropyrometer to measure the temperatures of plasma, electric charge, and gas excitation with spectral lines in their spectral power distributions. Second, the random noise of spectral power distribution contributes little or no affect to the temperature measurement accuracy since the integration effect of the noise is zero. Finally, any small glitches have little affect on the measurement accuracy. A large absorption or overlap spectral will be corrected by the spectral correction method described hereinafter.

The hue-angle is calculated by the relative spectral power distribution. Thus, the alexandrite effect pyrometer can accurately measure the temperature of blackbody as well as gray body, since the emissivity of a gray body is a constant that does not affect the calculations in Equations 2, 3 and 4.

To measure the temperature of a combustion chamber, a jet engine, or a rocket exhaust, for example, an optical window is always necessary to let radiation pass through to the optical probe of a pyrometer. The window material is usually a glass, a sapphire, or other optical materials. The present invention comprises a cubic zirconia crystal window to work in conjunction with the alexandrite effect pyrometers for high to ultrahigh temperatures. The cubic zirconia window can also be used for any other type of temperature measurement or purpose by any type of temperature measurement instrument. The cubic zirconia window can be installed inside a combustion chamber, a jet engine, or a rocket exhaust for the pyrometer to measure the temperature. The cubic zirconia crystal is made by the skull-melting method, and commonly stabilized by MgO, CaO, and $Y_2O_3$ to form the cubic crystal structure. The cubic zirconia crystal window has the following properties:

| | |
|---|---|
| Melting point: | 2750° C. |
| Hardness (Mohs): | 8.5 |
| Specific gravity: | 5.95 |
| Refractive index: | 2.17 |
| Maximum working temperature: | 2500° C. |
| Thermal shock resistance: | 170° C. |

The above-mentioned properties of the cubic zirconia window vary with stabilizers and mole percentage between the zirconia material and the stabilizer. The maximum working temperature of cubic zirconia window can reach 2500° C., which is the highest working temperature of all optical materials used for optical windows. The MgO partially stabilized zirconia has the highest thermal shock resistance of 500° C., with a maximum working temperature of 1100° C.

Cubic zirconia can be formed in many colors by adding color materials. For purposes of the optical window, colorless cubic zirconia crystal is used. A high quality colorless cubic zirconia usually has an inner spectral transmittance of 98% over the visible wavelength range. The cubic zirconia window with a spectral transmittance can be used for any particular purpose, such as for band pass in a required wavelength range for temperature measurement. The calibration of the pyrometer apparatus must include the cubic zirconia window.

Figure 3:
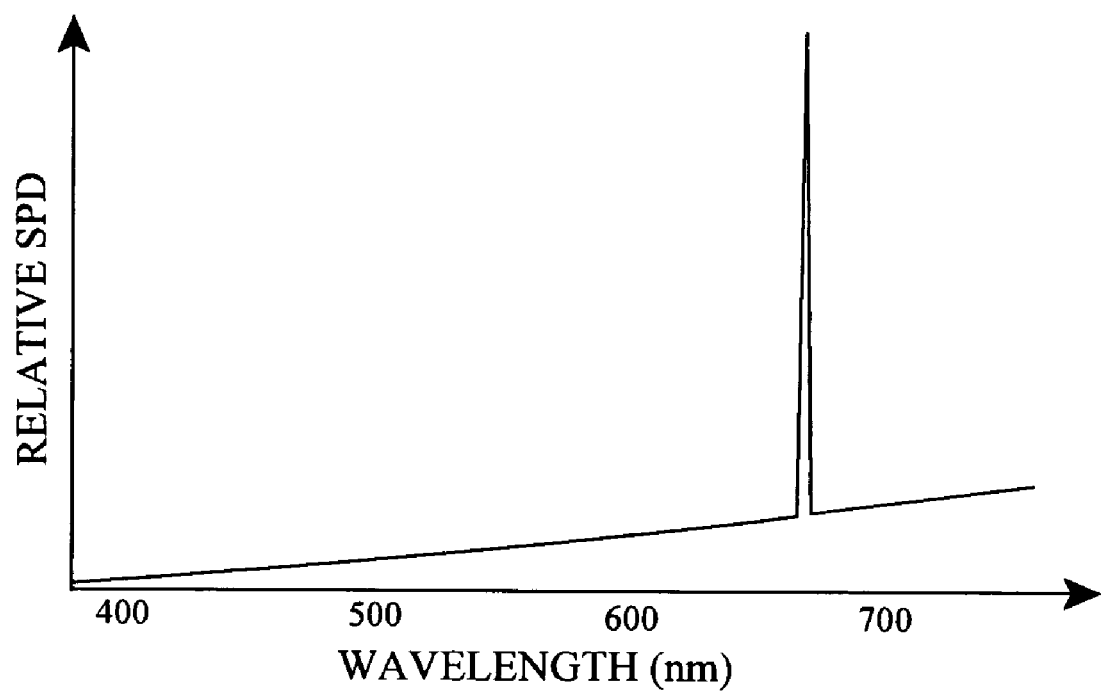
FIG. 3 is a graph illustrating the relative spectral power distribution of a radiating body with a spectral line at 660 nm.

Referring now to FIG. 3, a graph illustrating the relative spectral power distribution of a radiating body with a spectral line at 660 nm is shown. The measured temperature of the radiating body is 2366 K by the alexandrite effect pyrometer of the present invention. The key for the pyrometer for measuring the temperature of a radiating body with spectral lines is that Equation 2 integrates the whole wavelength range measured. The calculation includes the continuous spectrum and the spectral line. Still referring to FIG. 3, no other type of commercially available pyrometer can correctly and accurately measure the temperature of the radiating body with spectral lines. A two-wavelength pyrometer, for example, can only measure the temperature of the continuous spectrum, and yields significant error when measuring the temperature of a radiating body with spectral line emission. If neither of the two wavelengths used for temperature measurement are at 660 nm, the two-wavelength pyrometer outputs the temperature of the background spectrum, not the entire spectrum. In this case, the measured temperature by the two-wavelength pyrometer is approximately 2600 K for the radiating body with the spectral power distribution illustrated in FIG. 3. If one of the two-wavelengths is at 660 nm, the measured temperature greatly exceeds or is very much below the true temperature. This temperature measurement error renders the measured temperature meaningless. For similar reasons, the multi-wavelength pyrometers are also incapable of accurately measuring the temperature of a radiating body with spectral lines.

Figure 4:
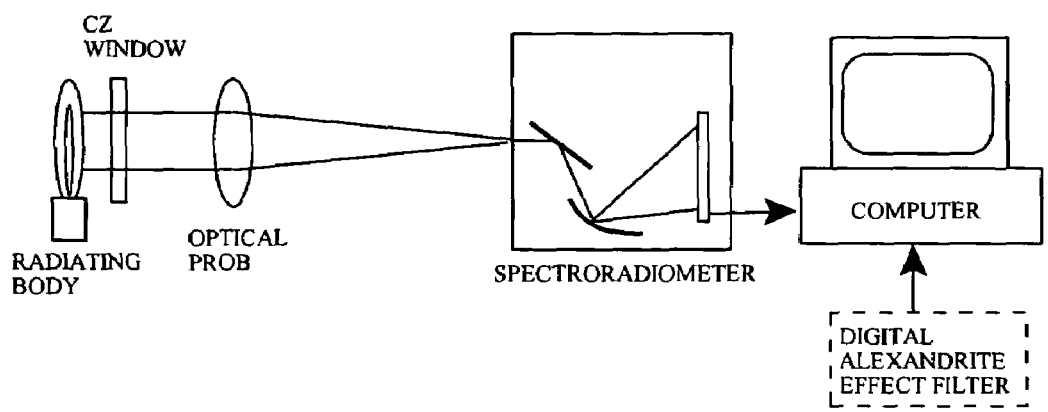
FIG. 4 is a schematic of a spectroradiometric pyrometer with a digital alexandrite effect filter in accordance with the present invention.
Figure 5:
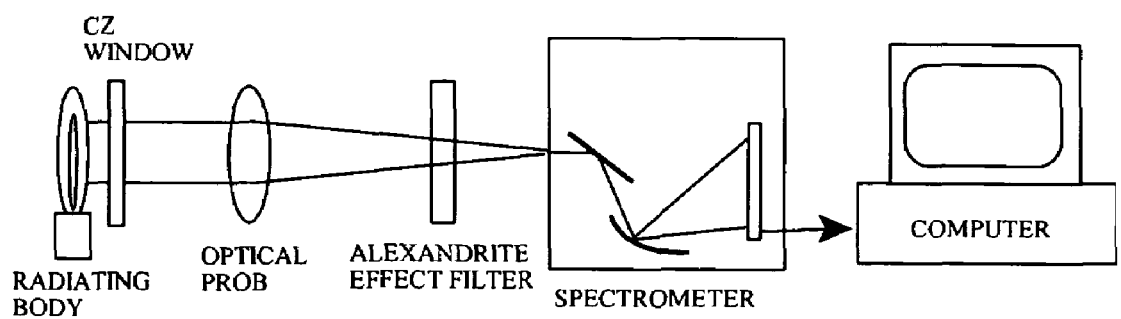
FIG. 5 is a schematic of a spectrometric pyrometer with an alexandrite effect filter in accordance with the present invention.
Figure 6:
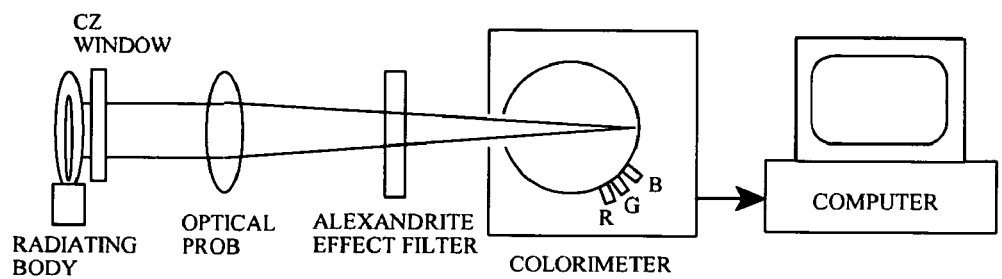
FIG. 6 is a schematic of a calorimetric pyrometer with an alexandrite effect filter in accordance with the present invention.

With reference to FIGS. 4 thru 6, different embodiments of the alexandrite effect pyrometer are illustrated. FIG. 4 depicts a spectroradiometric pyrometer with a digital alexandrite effect filter and is described under the Example 1 heading. FIG. 5 illustrates a spectrometric pyrometer with an alexandrite effect filter and is described under the Example 2 heading. FIG. 6 shows a calorimetric pyrometer with an alexandrite effect filter and is described under the Example 3 heading.

EXAMPLE 1

Referring now to FIG. 4, a schematic of a spectroradiometric pyrometer (spectropyrometer) with a digital alexandrite effect filter in accordance with the present invention is shown.

The optical probe receives radiation from a radiating body. The optical probe can be, but is not limited to, an optical fiber, a telescope, a microscope, a collimator, and an integrating sphere. If optical fiber is used, the optical probe may be positioned behind a cubic zirconia window inside a combustion chamber. If the optical probe is a telescope, the spectropyrometer can be used for non-contacting temperature measurement in the distance from several inches to as far as millions of light years for a star.

If a high temperature resistant window is necessary for measuring the temperature of a combustion chamber or other radiating bodies, the cubic zirconia window should be used. The cubic zirconia window allows the radiation of the combustion inside the chamber to pass through it, therefore enabling the optical probe to receive the radiation.

Next, an optical fiber or open space transmits the received radiation from the radiating body into a spectroradiometer, a spectrometer, or another type of spectral measurement device, such as, but not limited to, a spectral imaging system or a spectral graphic system. The spectroradiometer separates the radiation into a spectrum and outputs wavelength signals to the computer.

The computer uses a data acquisition and temperature calculation program to receive the wavelength signals from the spectroradiomenter, to calculate the hue-angle, and then to determine the temperature of the measured radiation body using Equation 6. The program can be written in any suitable programming language, such as, but not limited to, Visual C, Visual C++, and Visual Basic. The program also has the function of displaying the relative spectral power distribution on the screen for observation.

Still referring to FIG. 4, a digital alexandrite effect filter is pre-installed into the computer as a data file or is integrated into the computer calculation program. The digital alexandrite effect filter tabulates spectral transmittance of a selected alexandrite effect crystal, usually a synthetic alexandrite. In particular, the digital alexandrite effect filter tabulates the spectral transmittance measured along the a crystallographic axis of the alexandrite crystal with maximum hue change of approximately 180 degrees in the CIELAB color space between the CIE D65 daylight simulator at 6500 K and the CIE standard light source A at 2856 K. The digital alexandrite effect filter is used for calculating the tristimulus values in Equation 2.

The relationship between the hue-angle and temperature of the digital alexandrite effect filter is represented by Equation 6. The parameters of the equation can be calculated using the regression method, if the polynomial equation is used. If a different type of equation is used, a corresponding mathematical method should be used to determine the parameters. It may be difficult to generate the relationship in the whole temperature range within a required accuracy. In this case, the whole temperature range can be divided into two or more sections. Each section has its own mathematical relationship with corresponding parameters.

Using the digital alexandrite effect filter has three major advantages. First, all the filters are exactly the same for all alexandrite effect spectropyrometers. Next, the spectral curve of the alexandrite effect filter can be optimized to the largest hue-angle change in a given temperature range. Finally, as discussed below, the wavelength band can be moved to the infrared or ultraviolet range.

Still referring to FIG. 4, the wavelength range of the digital alexandrite effect filter can be moved without any restriction. Therefore, the wavelength range of this spectropyrometer ranges from ultraviolet at 100 nm to infrared range at 5000 nm, usually in the range between 200 nm to 2500 nm. The original wavelength range of the digital alexandrite effect filter is the visible range of 380 nm to 760 nm. It can be moved to the ultraviolet-visible wavelength range of 200 nm to 580 nm for ultrahigh temperature measurement, or to the near infrared range of 1000 nm to 1380 nm for low temperature measurement.

The CIE color matching functions need to be moved into the same wavelength range simultaneously for calculating the hue-angle and determining temperature. When the digital alexandrite effect filter moves away from its original wavelength range in the visible range, the calculated hue-angle represents a pseudo hue. The relationship between the pseudo hue-angle and temperature can be determined by calculation using the Planck's formula and Equations 2 thru 6.

Still referring to FIG. 4, the true spectrum of a measured radiating body can be altered by absorption and noise. The spectral correction function of the spectropyrometer is designed to correct the measured spectrum in case intrusion radiation and/or spectral absorption exist. A mathematical expression for the correction function $C(\lambda)$ is written as:

$$C(\lambda) = \frac{S(\lambda)}{S_m(\lambda)} \quad \text{(Equation 7)}$$

where $S(\lambda)$ is the true relative spectral power distribution of the measured radiating body, and $S_m(\lambda)$ is the measured spectral power distribution. The true relative spectral power distribution, such as the spectral power distribution of a graybody, should be known to those skilled in the art of temperature measurement. By using Equation 7, the true relative spectral power distribution of the measured radiating body will be obtained. Thus, the hue calculation and temperature determination are based on the corrected spectrum, resulting in accurate temperature measurement.

Still referring to FIG. 4, the spectropyrometer is calibrated against any standard light source for spectroradiometric calibration. The spectropyrometer need not be calibrated against any temperature standard. Thus, the calibration is easy and widely available, as well as accurate.

The spectropyrometer of FIG. 4 is advantageous because it can accurately measure the temperature of any radiating body emitting any type of spectral power distribution, it can provide the spectral power distribution of the measured radiating body, it can be calibrated as a spectroradiometer against a standard lamp in the measured wavelength range rather than a temperature standard, it can correct the measured spectral power distribution by filtering out disturbing spectrum and by compensating for spectral absorption, and its wavelength range can be moved to the infrared range for low temperature measurement, or to the ultraviolet range for ultrahigh temperature measurement.

EXAMPLE 2

With reference to FIG. 5, a schematic of the spectrometric pyrometer with an alexandrite effect filter in accordance with the present invention is shown. The spectrometric pyrometer consists of a cubic zirconia window, an optical probe, an alexandrite effect filter, a spectrometer, and a computer.

The optical probe receives radiation from a radiating body. The optical probe can be, but is not limited to, an optical fiber, a telescope, a microscope, a collimator, and an integrating sphere. The received radiation passes through optical fiber and the alexandrite effect filter into the spectrometer. The spectrometer separates the radiation into a spectrum by means of diffraction grating or other means. A detector or a detector array receives the spectrum, and produces electronic vs. wavelength signals. The computer receives the signals, and converts them to be the spectral power distribution modulated by the alexandrite effect filter for the radiating body. The computer then calculates the hue-angle and the temperature of the radiating body.

Still referring to FIG. 5, the wavelength range for the spectrometric type of the alexandrite effect pyrometer is in the visible range of 380 nm to 760 nm. The minimum wavelength range is from 400 nm to 700 nm, and can be extended to the range of 300 nm to 830 nm.

Still referring to FIG. 5, the spectrometric pyrometer is calculated against a standard light source without the alexandrite effect filter inserted. No temperature calibration is necessary. However, the spectral transmittance of the particular alexandrite effect filter must be measured accurately for calculating the parameters of Equation 6. The spectrometric pyrometer of FIG. 5 is advantageous because it can accurately measure the temperature of any type of radiating body.

EXAMPLE 3

Referring now to FIG. 6, a schematic of a calorimetric pyrometer with an alexandrite effect filter in accordance with the present invention is shown. The calorimetric pyrometer consists of a cubic zirconia window, an optical probe, an alexandrite effect filter, a calorimeter and a computer. The calorimeter comprises an integrating sphere with R, G, and B detectors attached.

Still referring to FIG. 6, the optical probe, such as a telescope, receives radiation from a radiating body. The received radiation passes through and is modulated by the alexandrite effect filter. The alexandrite effect filter generates a color corresponding to the temperature of the radiating body.

After passing through the alexandrite effect filter, the modulated radiation enters into the integrating sphere of the calorimeter. The wavelength range of the colorimeter is usually in the visible range of 380 to 760 nm. The minimum wavelength range is from 400 to 700 nm. Any wavelength range smaller than the minimum range will significantly affect the accuracy of temperature measurement.

The R, G, and B detectors attached to the integrating sphere simulate the color matching function of the CIE standard calorimetric observer, and receive radiation as modulated by the alexandrite filter. The detectors produce the three tristimulus signals respectively, which are sent to the computer to calculate the hue angle and temperature of the radiating body.

The tristimulus values produced by the R, G, and B detectors are usually not the true tristimulus values. The relationship between the tristimulus values received by the computer and the true tristimulus values must be predetermined by calibration and calculation. After receiving the tristimulus values produced by the R, G, and B detectors, the computer calculates the true tristimulus values. The computer then calculates the hue-angle and temperature of the radiating body.

Still referring to FIG. 6, the calorimetric pyrometer must be calibrated against standard white tile under a standard light source for calorimetric calibration without the alexandrite effect filter. Due to the slight variation of the alexandrite effect filter, the spectral transmittance of the alexandrite effect filter must be measured, and the relationship between the temperature and hue angle must be pre-calculated and installed into the computer for each individual calorimetric pyrometer as a data file for temperature determination by the computer program.

The calorimetric pyrometer of FIG. 6 is advantageous because it can operate quickly and is relatively inexpensive to manufacture.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

References Cited

| U.S. PATENT DOCUMENTS | | | | |
|---|---|---|---|---|
| 3,912,521 | | October 1975 | Cline | 106/42 |
| 4,142,417 | A | * March 1979 | Cashdollar | 73/355 |
| 4,240,834 | A | * December 1980 | Machida | 106/42 |
| 4,880,314 | A | * November 1989 | Kienitz | 374/129 |
| 5,326,172 | A | * July 1994 | Ng | 374/126 |
| 5,772,323 | A | * June 1998 | Felice | 374/127 |
| 6,357,910 | B1 | * March 2002 | Chen | 374/131 |

OTHER PUBLICATIONS

BUKIN ET AL., "Growth of Alexandrite Crystals and Investigation of Their Properties" Journey of Crystal Growth, vol. 52, pp. 537–541, 1981.
BENTLEY, *Temperature and Humidity Measurement*, Springer, Singapore, 1998, pp. 119–131.
LIU ET AL., "The 'Alexandrite Effect' in Gemstones", Color Research & Application, vol. 19, No. 3, pp. 186–191, 1994.
LIU ET AL., "Relationship Between the Crystallographic Orientation and the Alexandrite Effect in Synthetic Alexandrite", Mineralogical Magazine, vol. 59, pp. 111–114, 1995.
LIU ET AL., "Abnormal Hue-angle Change of the Gemstone Tanzanite between CIE Illuminants D65 and A in CIELAB Color Space", Color Research & Application, vol. 20, No. 4, pp. 245–250, 1995.
MICHALSKI ET AL., *Temperature Measurement*, 2nd ed. Wiley, Chichester, 2001, pp. 151–228.

What is claimed is:

1. A method for determining the temperature of a radiating body utilizing the alexandrite effect, the method comprising the steps of:
   receiving radiation from the radiating body;
   measuring a spectral power distribution of the radiation;
   filtering the spectral power distribution with an alexandrite effect filter;
   calculating a hue value based on the measured spectral power distribution; and
   calculating the temperature based on a predetermined mathematical relationship between the hue angle and temperature of the alexandrite effect filter.

2. The method according to claim 1 wherein the alexandrite effect refers to a color change of a material under a blackbody radiator at different temperatures.

3. The method according to claim 1 wherein the alexandrite effect further refers to a color change of a material under different types of light sources at different color temperature.

4. The method according to claim 1 wherein the alexandrite effect filter comprises any material that shows the alexandrite effect.

5. The method according to claim 1 wherein the spectral power distribution has a wavelength range from ultraviolet radiation (100 nm) to infrared radiation (5,000 nm).

6. The method according to claim 1 wherein the predetermined mathematical relationship is generated by the steps of:
   measuring a spectral transmittance of the alexandrite effect filter along the direction perpendicular to its surface;
   calculating hue angle for the alexandrite effect filter under a blackbody at different temperatures in a selected color space; and
   determining the mathematical relationship between the hue values and corresponding temperatures in the color space in which the hue values are calculated.

7. The method according to claim 6 wherein the mathematical relationship between the hue angle and temperature of the alexandrite effect filter can be generated in any color space.

8. The method according to claim 7 wherein the color space is selected from the group consisting of CIELAB, CIELUV, and CIE(x, y), the CIELAB color space being typically selected due to its uniformity for color perception.

9. The method according to claim 1 wherein the mathematical relationship between the hue angle and temperature of the alexandrite effect filter is generated utilizing the following equations in the CIELAB color space:

$$X = \int \bar{x}(\lambda) s(\lambda) P(\lambda) d\lambda$$

$$Y = \int \bar{y}(\lambda) s(\lambda) P(\lambda) d\lambda$$

$$Z = \int \bar{z}(\lambda) s(\lambda) P(\lambda) d\lambda$$

where X, Y, and Z are CIE tristimulus values of the alexandrite effect filter, $\bar{x}(\lambda)$, $\bar{y}(\lambda)$, and $\bar{z}(\lambda)$ are CIE color-matching functions, $s(\lambda)$ is the spectral power distribution of the radiating body measured, and $P(\lambda)$ is a spectral transmittance of the alexandrite effect filter used;

$$L^* = 116(Y/Y_n)^{1/3} - 16$$

$$a^* = 500[(X/X_n)^{1/3} - (Y/Y_n)^{1/3}]$$

$$b^* = 200[(Y/Y_n)^{1/3} - (Z/Z_n)^{1/3}]$$

where $L^*$, $a^*$ and $b^*$ are coordinates of CIELAB color space, and $X_n$, $Y_n$, and $Z_n$ are the tristimulus values of the measured radiating body;

$$h_{ab} = \arctan(b^*/a^*)$$

where h is the hue angle;

$$T = f(h)$$

where T is the temperature of the radiating body, the temperature being a function of the hue angle h selected from the group consisting of a polynomial function, an exponential function, a logarithmic function, a trigonometric function, and mixtures thereof, wherein the following polynomial equation is typically selected:

$$T = a_0 + a_1 h + a_2 h^2 + \ldots + a_n h^n$$

where a is a parameter in a polynomial function to the $n^{th}$ power of the hue-angle, wherein large values of n correspond to more accuracy of the polynomial function, n being equal to 3 for small temperature ranges, and n being equal to 6 for large temperature ranges.

10. The method according to claim 9 wherein parameters of the polynomial equation are obtained by regression calculations using data of the hue angle versus temperature.

11. The method according to claim 9 wherein only a long wavelength component of the $\bar{x}(\lambda)$ function is used to calculate the hue angle, the used $\bar{x}(\lambda)$ function having actual values from 510 nm to 760 nm and being zero from 380 nm to 510 nm.

* * * * *